April 23, 1935. T. J. BRADEN 1,998,892
PACKING
Filed May 1, 1933

INVENTOR
Tillman J. Braden
BY
Chappell & Earl
ATTORNEYS

Patented Apr. 23, 1935

1,998,892

UNITED STATES PATENT OFFICE 1,998,892

PACKING

Tillman J. Braden, Kalamazoo, Mich., assignor to Durametallic Corporation, Kalamazoo, Mich.

Application May 1, 1933, Serial No. 668,892

4 Claims. (Cl. 154—45.5)

The main objects of this invention are:

First, to provide an improved packing which is capable of very wide application and has a high sealing or packing efficiency.

Second, to provide an improved packing which is very desirable for use on shafts, rods, stems or the like to resist or withstand high pressure without objectionably increasing friction.

Third, to provide a packing which is highly adaptable to particular requirements or conditions.

Fourth, to provide a packing which is efficient in preventing scoring, either of the packing or of the rod, shaft or stem with which it is used.

Fifth, to provide an improved method of making packings having the advantages above outlined.

Objects pertaining to details and economies of my invention will definitely appear from the description to follow. The invention is defined in the claims.

An embodiment of my invention is clearly illustrated in the accompanying drawing, in which.

In the manufacture of my improved packing and packing material I employ short strips, shreds or pieces of metal indicated at 1, preferably of metal foil such as lead, aluminum, Babbitt metal, copper, zinc, antimony or other suitable metal, or varying combinations of these materials, mixed with loose fibers indicated at 2 of asbestos, hemp, flax or other fibrous material, and graphite, talc, mica, or similar mineral lubricant in the proportions of 25% to 50% of the metal by bulk and 75% to 50% of the fibrous material and graphite or other mineral lubricant. It will be understood that the graphite is a comparatively small percentage, gaged by bulk, but is sufficient in quantity to provide a substantial distribution of such material throughout the mixture.

These ingredients are thoroughly mixed with a lubricating oil, preferably castor oil, in sufficient quantity to render the mass plastic or moldable, and for certain uses sufficiently plastic to render it extrusile in the form of quite a solid core 3. In some cases it will be found of advantage to thoroughly lubricate the fibrous material and allow it to partially dry before attempting to mix it with the other ingredients.

To this plastic mixture I add flaked or powdered metal, preferably finely flaked aluminum, although zinc, lead, Babbitt metal, bronze and certain other metals or alloys may be flaked and/or powdered for the purpose. This powdered metal is introduced into a mix of rubber or rubber cement and gasoline or other solvent in approximately equal parts, the metal varying according to purposes for which the packing is to be used, from 10% to 60% by bulk of the rubber and its solvent. This rubber and metal mixture, while still in fluid form, is thoroughly mixed with the previously described mixture.

Figure 2:
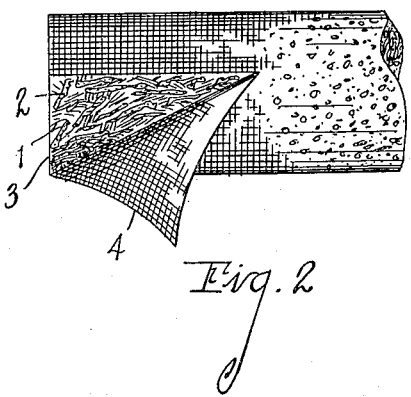
Fig. 2 is a side elevation of a strip of packing embodying a compacted or extruded core of the plastic packing material encased within a seamless fabric tube.
Figure 3:
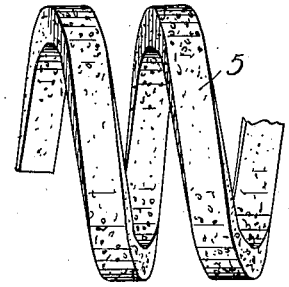
Fig. 3 is a side elevation of a spirally coiled strip of the encased packing.

This material may be used as a plastic packing with highly satisfactory results, that is, it may be introduced directly into the packing box without any previous shaping or conforming operations. This plastic packing may, however, be provided with a casing or covering, preferably a fabric tube 4, as shown in Figs. 2 and 3. This fabric tube is preferably a knitted seamless tube, and the plastic packing material is extruded into a substantially solid core therein as illustrated in Figs. 2 and 3. I have not shown the machine or apparatus for extruding this material and applying the casing or sheath thereto.

After the core of the plastic packing material has been encased within the fabric tube or sheath, the whole is dipped in a mixture of aluminum flakes or comminuted aluminum and rubber cement or fluid rubber, with sufficient gasoline or other solvent to reduce the cement or rubber to proper fluidity. This is allowed to dry and it is then possible to conform the packing to a rectangular cross section and into a coil 5 as shown in Fig. 3. It is found that after this treatment the encased packing material may be formed into a coil as shown in Fig. 3 with very little tendency to break or crack the core. I am unable to state definitely the reason for this condition but possibly it results from the action of the castor oil on the rubber. While castor oil will not mix with the rubber, it does cause a rapid change in the rubber.

Figure 4:
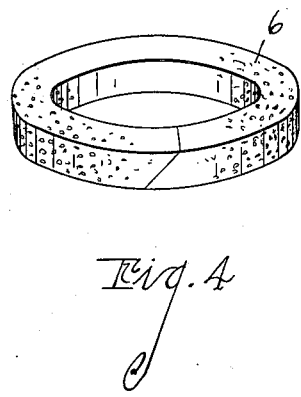
Fig. 4 is a perspective view of a packing ring embodying my invention.
Figure 1:
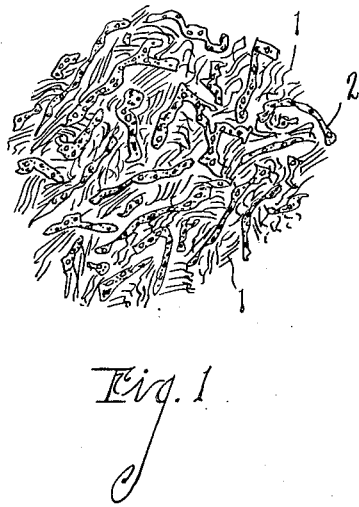
Fig. 1 is a conventional illustration of my improved packing material as a plastic packing, or when adapted to be introduced into a packing box as a plastic.

The packing may be marketed in the form shown in Fig. 3 in which form it may be readily introduced into the packing box or a further step may be performed thereon, that of compressing by means of a die into a substantially continuous ring 6, shown in Fig. 4. A suitable section of the coil shown in Fig. 3 is placed in a die and pressure applied, preferably in the form of a blow or repeated blows, which conform the packing into a rather solid ring, in which form the packing is adapted for use as a ring packing.

The coating containing the aluminum flakes is highly desirable, the rubber binder serving to retain the flakes upon the packing, even after the forming treatment which I have described. In use the comminuted or flaked aluminum appears to shift about sufficiently so that it smooths up the rod, shaft or stem to which the packing is applied, giving it the appearance of a polished surface, and this finely divided metal also appears to fill up any recesses or interstices in the packing, preventing scoring of the packing and greatly reducing friction. This is particularly desirable where the packings are used to withstand high pressures and high temperatures.

The packing has a very wide application in view of the various forms in which it is practical to embody the same.

Having thus described my invention what I claim as new and desire to secure by Letters Patent is:

1. A packing for moving parts or bearings consisting of a tubular sheath or casing of knitted fabric containing a plastic or moldable mass of packing material, and a coating of rubber cement and comminuted aluminum flakes on said packing material and sheath or casing.

2. A packing comprising a semi-solid moldable continuous core-like body or filler encased within a tube of fabric coated with comminuted flaked aluminum mixed with a fluid rubber binding material.

3. A packing consisting of a core or body of semi-solid plastic material enclosed within a tubular fabric casing and molded into a packing ring, the casing being coated with finely flaked aluminum, and a fluid binding material.

4. A laminated packing for moving parts or bearings, consisting of a packing element, and a coating of rubber cement and comminuted aluminum flakes on said packing element.

TILLMAN J. BRADEN.